United States Patent
Otani et al.

(10) Patent No.: US 11,146,034 B2
(45) Date of Patent: Oct. 12, 2021

(54) LASER OSCILLATOR UNIT AND LASER MACHINING DEVICE

(71) Applicant: PANASONIC INDUSTRIAL DEVICES SUNX CO., LTD., Aichi (JP)

(72) Inventors: Taku Otani, Aichi (JP); Takayoshi Miyazaki, Aichi (JP); Tetsuji Takamido, Aichi (JP)

(73) Assignee: PANASONIC INDUSTRIAL DEVICES SUNZ CO., LTD., Aichi (JP)

( * ) Notice: Subject to any disclaimer, the term of this patent is extended or adjusted under 35 U.S.C. 154(b) by 0 days.

(21) Appl. No.: 16/969,251

(22) PCT Filed: Jan. 23, 2019

(86) PCT No.: PCT/JP2019/002135
§ 371 (c)(1),
(2) Date: Aug. 12, 2020

(87) PCT Pub. No.: WO2019/187555
PCT Pub. Date: Oct. 3, 2019

(65) Prior Publication Data
US 2021/0006028 A1   Jan. 7, 2021

(30) Foreign Application Priority Data
Mar. 30, 2018   (JP) ............... JP2018-066796

(51) Int. Cl.
*H01S 3/02*      (2006.01)
*H01S 3/034*     (2006.01)
*H01S 3/00*      (2006.01)

(52) U.S. Cl.
CPC ............ *H01S 3/034* (2013.01); *H01S 3/0085* (2013.01); *H01S 3/025* (2013.01)

(58) Field of Classification Search
CPC ........ H01S 3/034; H01S 3/0085; H01S 3/025; H01S 3/10061; H01S 3/0404;
(Continued)

(56) References Cited

U.S. PATENT DOCUMENTS 9,702,532 B1 *  7/2017  Pierce ................. G02B 7/00
2005/0271110 A1 * 12/2005  Paetzel ................ H01S 3/02
                                                    372/65
(Continued)

FOREIGN PATENT DOCUMENTS

JP   S63-050083 A   3/1988
JP   H11-317557 A   11/1999
(Continued)

OTHER PUBLICATIONS

International Search Report issued in Patent Application No. PCT/JP2019/002135 dated Apr. 15, 2019.
(Continued)

*Primary Examiner* — Xinning(Tom) Niu
(74) *Attorney, Agent, or Firm* — Pearne & Gordon LLP

(57) ABSTRACT

A laser oscillator unit includes an amplification unit configured to amplify laser light and emit amplified laser light from an emitting portion; a case covering the amplification unit; and an outer support mechanism and an inner support mechanism provided on the case. The case is formed with a window portion. An outer movable leg allows the case to slide in a radial direction around an outer fixed leg. An inner movable leg allows the amplification unit to slide in the radial direction around an inner fixed leg. A straight line passing through a center of the outer fixed leg and a center of the inner fixed leg intersects with a straight line passing through the emitting portion and the window, and a laser
(Continued)

optical axis emitted from the emitting portion and a laser optical axis emitted from the window portion coincide with each other.

10 Claims, 2 Drawing Sheets

(58) Field of Classification Search
CPC ............... H01S 3/0407; H01S 3/2333; H01S 3/094053; B23K 26/00
See application file for complete search history.

(56) References Cited

U.S. PATENT DOCUMENTS

| | | | |
|---|---|---|---|
| 2008/0037604 A1* | 2/2008 | Savage-Leuchs | ............................ H01S 5/02325 372/44.01 |
| 2013/0287053 A1 | 10/2013 | Zeninari et al. | |
| 2015/0110136 A1* | 4/2015 | Schusslbauer | .......... H01S 3/025 372/6 |
| 2015/0318657 A1* | 11/2015 | Murakami | .............. F21V 21/14 362/418 |

FOREIGN PATENT DOCUMENTS

| JP | 2000-012939 A | 1/2000 |
|---|---|---|
| JP | 2008-060261 A | 3/2008 |
| JP | 2015-213126 A | 11/2015 |

OTHER PUBLICATIONS

Written Opinion issued in Patent Application No. PCT/JP2019/002135 dated Apr. 15, 2019.

* cited by examiner

LASER OSCILLATOR UNIT AND LASER MACHINING DEVICE

TECHNICAL FIELD

The present invention relates to a laser oscillator unit and a laser machining device including a laser oscillator unit.

BACKGROUND ART

As an example of a laser oscillator unit, there is a laser device in which a resonator unit (amplification unit) is accommodated in a housing (case) (for example, Patent Literature 1). The housing may expand and contract due to heat and deform. The laser device includes a plurality of bearings (inner movable legs) that slidably support the resonator unit with respect to the housing, and suppresses deformation of the resonator unit.

CITATION LIST

Patent Literature

Patent Literature 1: JP-A-S63-050083

SUMMARY OF INVENTION

Technical Problem

The laser device outputs laser light emitted from the resonator unit to the outside of the housing. Therefore, when the housing is deformed, a position of a portion (window portion) to which the laser light is output from the housing may change, and an optical axis of the laser light output from the laser device may deviate.

Such a problem may occur not only in the laser device but also in a laser oscillator unit and a laser machining device.

An object of the present invention is to provide a laser oscillator unit and a laser machining device that can reduce a deviation of an optical axis due to expansion and contraction of a case.

Solution to Problem

Hereinafter, the solution to the above-described problem and operation and effects thereof will be described. In order to solve the problem as described above, there is provided a laser oscillator unit including: an amplification unit configured to amplify incident laser light and emit amplified laser light from an emitting portion; a case covering the amplification unit; an outer support mechanism provided outside the case and supporting the case with respect to a base; and an inner support mechanism provided inside the case and supporting the amplification unit with respect to the case, wherein the case is formed with a window portion that outputs the laser light emitted from the emitting portion to an outer side of the case by spatial transmission, wherein the outer support mechanism includes an outer fixed leg that is fixed to the base and the case, and a plurality of outer movable legs that slidably support the case with respect to the base, wherein at least one outer movable leg of the plurality of outer movable legs allows the case to slide in a radial direction around the outer fixed leg, wherein the inner support mechanism includes an inner fixed leg that is fixed to the amplification unit and the case, and a plurality of inner movable legs that slidably support the amplification unit with respect to the case, wherein at least one inner movable leg of the plurality of inner movable legs allows the amplification unit to slide in a radial direction around the inner fixed leg, and wherein a straight line passing through a center of the outer fixed leg and a center of the inner fixed leg intersects with a straight line passing through the emitting portion and the window portion, and a laser optical axis emitted from the emitting portion and a laser optical axis emitted from the window portion coincide with each other.

The case may expand or contract with a change in an ambient temperature. In this regard, according to this configuration, since the laser oscillator unit includes the plurality of outer movable legs, even when the case expands or contracts, the plurality of outer movable legs allow the case to expand and contract, and twisting of the case can be reduced. Since the laser oscillator unit includes the plurality of inner movable legs, it is possible to reduce a possibility that the expansion and contraction of the case is transmitted to the amplification unit. Since the at least one outer movable leg allows the case to slide in the radial direction around the outer fixed leg, it is possible to reduce a possibility that the window portion moves even when the case expands and contracts. Since the at least one inner movable leg allows the amplification unit to slide in the radial direction around the inner fixed leg, it is possible to reduce a possibility that the emitting portion moves even when the case expands and contracts. The straight line passing through the center of the outer fixed leg and the center of the inner fixed leg intersects with the straight line passing through the emission portion and the window portion, and the optical axis of the laser light emitted from the emitting portion and the optical axis of the laser light emitted from the window portion coincide with each other, so that it is possible to reduce a possibility that the optical axis is inclined when the case expands and contracts. Therefore, the deviation of the optical axis due to the expansion and contraction of the case can be reduced.

In the laser oscillator unit described above, it is preferable that the amplification unit includes an amplification portion that amplifies the incident laser light, a support portion that supports the amplification portion, and the case and the support portion are made of metal.

According to this configuration, the case and the support portion are made of the metal. Therefore, for example, as compared with a case where the case and the support portion are made of resin, the expansion and contraction of the case and the support portion are large, and the positions of the window portion and the emitting portion are likely to deviate. In this respect, since the laser oscillator unit includes the outer support mechanism and the inner support mechanism, it is possible to reduce a possibility that the optical axis deviates.

In the laser oscillator unit described above, it is preferable that the case and the support portion are made of mutually different metals.

According to this configuration, the case and the support portion are made of mutually different metals. Therefore, for example, as compared with a case where the case and the support portion are made of the same metal, a difference in the expansion and contraction of the case and the support portion due to a difference in a thermal expansion coefficient becomes large, and the positions of the window portion and the emitting portion are likely to deviate. In this respect, since the laser oscillator unit includes the outer support mechanism and the inner support mechanism, it is possible to reduce the possibility that the optical axis deviates.

In the laser oscillator unit described above, it is preferable that a straight line connecting the outer movable leg and the outer fixed leg, the outer movable leg slidably supporting the case in the radial direction around the outer fixed leg, is parallel to a straight line connecting the inner movable leg and the inner fixed leg, the inner movable leg slidably supporting the amplification unit in the radial direction around the inner fixed leg.

According to this configuration, a slidable direction of the case and a slidable direction of the amplification unit are parallel. Therefore, when the case expands or contracts, the case and the amplification unit have the same sliding direction, so that a deviation amount of the slide between the case and the amplification unit can be suppressed.

In the laser oscillator unit described above, it is preferable that each of the plurality of outer movable legs allows the case to slide in the radial direction around the outer fixed leg, and the straight lines connecting the outer movable legs and the outer fixed leg intersect with each other at an acute angle.

According to this configuration, since the plurality of outer movable legs allows the case to slide in the radial direction around the outer fixed leg, a direction in which the case expands and contracts can be defined. Since the straight lines connecting the outer movable legs and the outer fixed legs intersect with each other at the acute angle, a mechanism that allows the case to slide can be made simpler than a case where the plurality of outer movable legs are arranged apart from each other.

In the laser oscillator unit described above, it is preferable that distances from the plurality of outer movable legs to the outer fixed leg are the same.

The amount of expansion or contraction of the case when the case expands or contracts increases as the case moves away from the outer fixed leg. In this regard, according to this configuration, since the plurality of outer movable legs have the same distance to the outer fixed leg, a variation in a slide amount of the plurality of outer movable legs to allow the case to slide can be reduced.

In the laser oscillator unit described above, it is preferable that the straight line passing through the center of the outer fixed leg and the center of the inner fixed leg is orthogonal to the straight line passing through the emitting portion and the window portion.

According to this configuration, since the straight line passing through the center of the outer fixed leg and the center of the inner fixed leg is orthogonal to the straight line passing through the emitting portion and the window portion, the deviation between the emitting portion and the window portion can be further reduced.

In the laser oscillator unit described above, it is preferable that a linear distance between the outer fixed legs and the window portion is shorter than a linear distance between the outer movable leg and the window portion, and a linear distance between the inner fixed legs and the emitting portion is shorter than a linear distance between the inner movable leg and the emitting portion.

According to this configuration, the outer fixed leg is located closer to the window portion than the outer movable leg, and the inner fixed leg is located closer to the emitting portion than the inner movable leg. Therefore, it is possible to reduce the possibility that the window portion or the emitting portion move even when the case expands and contracts.

In the laser oscillator unit described above, it is preferable that the outer support mechanism is provided on a bottom surface of the case facing the base. For example, when the outer support mechanism is provided on a side surface of the case, the outer support mechanism needs to allow the expansion and contraction of the case in the direction along the bottom surface and the direction intersecting with the bottom surface. In this respect, according to this configuration, the outer support mechanism is provided on the bottom surface of the case. Therefore, the outer support mechanism only needs to allow the expansion and contraction of the case in the direction along the bottom surface, and a configuration of the outer support mechanism can be simplified.

In order to solve the problem as described above, there is provided a laser machining device including: the laser oscillator unit configured as described above; and a condenser lens configured to condense laser light output from the laser oscillator unit. The laser machining device machines a machining target object by the condensed laser light.

According to this configuration, the same effect as that of the laser oscillator unit can be obtained.

ADVANTAGEOUS EFFECTS OF INVENTION

According to the present invention, the deviation of the optical axis due to the expansion and contraction of the case can be reduced.

DESCRIPTION OF EMBODIMENTS

Hereinafter, an embodiment of a laser oscillator unit and a laser machining device will be described with reference to the drawings.

Figure 1:
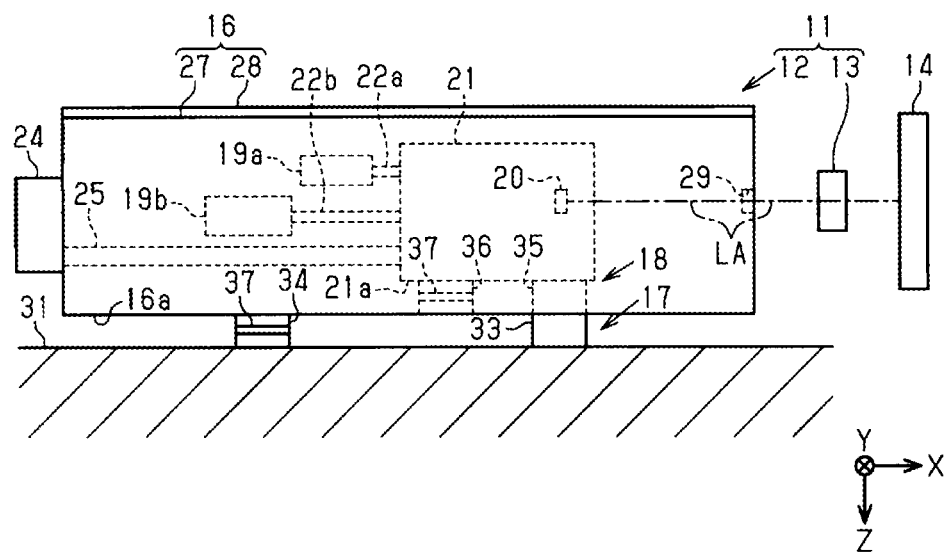
FIG. 1 is a schematic side view of a laser machining device according to an embodiment.

As shown in FIG. 1, a laser machining device 11 includes a laser oscillator unit 12 that amplifies and outputs laser light, and a condenser lens 13 that condenses the laser light output from the laser oscillator unit 12. The laser machining device 11 machines a machining target object 14 with condensed laser light.

The laser oscillator unit 12 includes a substantially rectangular parallelepiped case 16, an outer support mechanism 17 provided outside the case 16, and an inner support mechanism 18 provided inside the case 16. The laser oscillator unit 12 includes a light source laser diode (LD) 19a that emits seed laser light, an excitation laser diode (LD) 19b that emits excitation laser light, and an amplification unit 21 that amplifies incident seed laser light and emits amplified laser light from an emitting portion 20. The emitting portion 20 is configured by, for example, a reflection mirror.

The laser oscillator unit 12 includes a first optical fiber 22a connecting the light source LD 19a and the amplification unit 21, and a second optical fiber 22b connecting the excitation LD 19b and the amplification unit 21. The first optical fiber 22a transmits the seed laser light to the amplification unit 21, and the second optical fiber 22b transmits the excitation laser light to the amplification unit 21.

The laser oscillator unit 12 includes a cooling mechanism 24 for cooling the amplification unit 21, and a cooling pipe 25 connecting the cooling mechanism 24 and the amplification unit 21. The cooling pipe 25 is provided in a ring shape around the amplification unit 21 and through the inside thereof The cooling mechanism 24 cools the amplification unit 21 by circulating a coolant including a liquid such as water or a gas such as air through the cooling pipe 25.

Figure 2:
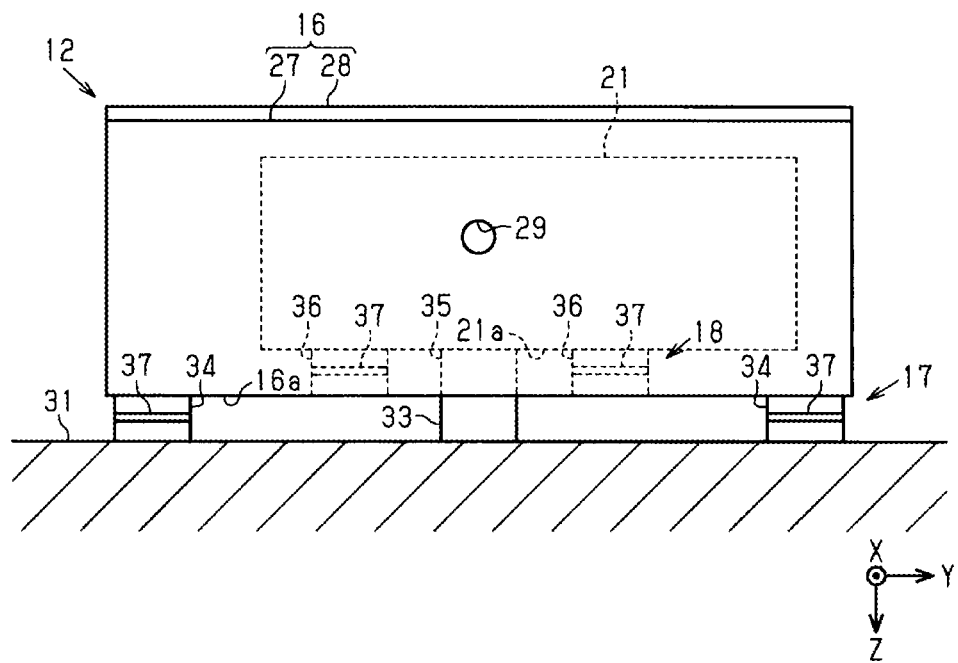
FIG. 2 a schematic front view of a laser oscillator unit included in a laser machining device of FIG. 1.

As shown in FIGS. 1 and 2, the case 16 includes a bottomed box-shaped main body 27 and a lid 28 that covers an opening of the main body 27. The case 16 covers the inner support mechanism 18, the light source LD 19a, the excitation LD 19b, the amplification unit 21, the first optical fiber 22a, and the second optical fiber 22b accommodated in the main body 27 with a lid 28. The case 16 is formed with a window portion 29 that outputs laser light to the outside of the case 16 through spatial transmission. The emitting portion 20 emits the laser light toward the window portion 29, and the window section 29 outputs the laser light emitted from the emitting portion 20. An optical axis (laser optical axis) LA of the laser light emitted from the emitting portion 20 and an optical axis (laser optical axis) LA of the laser light output from the window portion 29 to the outside of the case 16 coincide with each other. Therefore, the optical axis LA of the laser light emitted from the emitting portion 20 is along a straight line passing through the emitting portion 20 and the window portion 29.

In the drawings, a direction in which the optical axis LA of the laser light output from the window portion 29 extends is indicated by an X-axis, and directions along a plane orthogonal to the X-axis are indicated by a Y-axis and a Z-axis. The X-axis, the Y-axis, and the Z-axis are orthogonal to each other. In the present embodiment, a direction along the Z-axis is a direction of gravity, and a state in which the laser oscillator unit 12 is placed on a horizontal plane of a base 31 is illustrated, but the direction of gravity may be a direction intersecting with the Z-axis or a direction opposite to the Z-axis. In the following description, a direction along the X-axis is referred to as an X-axis direction, a direction along the Y-direction is referred to as a Y-axis direction, and a direction along the Z-axis is referred to as a Z-axis direction.

The outer support mechanism 17 is provided on a bottom surface 16a of the case 16 facing the base 31, and supports the case 16 with respect to the base 31. The outer support mechanism 17 includes an outer fixed leg 33 fixed to the base 31 and the case 16, and a plurality of outer movable legs 34 that slidably support the case 16 with respect to the base 31. The laser oscillator unit 12 of the present embodiment includes two outer movable legs 34, and supports the case 16 at three points by the outer fixed leg 33 and the outer movable legs 34.

The inner support mechanism 18 is provided on a bottom surface 21a of the amplification unit 21 facing the main body 27, and supports the amplification unit 21 with respect to the case 16. The inner support mechanism 18 includes an inner fixed leg 35 fixed to the amplification unit 21 and the case 16, and a plurality of inner movable legs 36 that slidably support the amplification unit 21 with respect to the case 16. The laser oscillator unit 12 of the present embodiment includes two inner movable legs 36, and supports the amplification unit 21 at three points by the inner fixed leg 35 and the inner movable legs 36.

The outer movable leg 34 and the inner movable leg 36 each include a slide mechanism 37. The outer fixed leg 33 is provided in the vicinity of the window portion 29, and the plurality of outer movable legs 34 are arranged at positions farther from the window portion 29 than the outer fixed leg 33. A linear distance between the outer fixed leg 33 and the window portion 29 is shorter than a linear distance between the outer movable leg 34 and the window portion 29. The inner fixed leg 35 is provided in the vicinity of the emitting portion 20, and the plurality of inner movable legs 36 are arranged at positions farther from the emitting portion 20 than the inner fixed leg 35. A linear distance between the inner fixed leg 35 and the emitting portion 20 is shorter than a linear distance between the inner movable leg 36 and the emitting portion 20.

The outer fixed leg 33 and the inner fixed leg 35 are arranged so as to sandwich the main body 27 in the Z-axis direction, and are arranged at the same position as the emitting portion 20 in the X-axis direction and the Y-axis direction. The outer fixed leg 33, the inner fixed leg 35, and the emitting portion 20 are arranged in the Z-axis direction. Therefore, a straight line passing through a center of the outer fixed leg 33 and a center of the inner fixed leg 35 extends in the Z-axis direction and is orthogonal to a straight line passing through the emitting portion 20 and the window portion 29.

Figure 3:
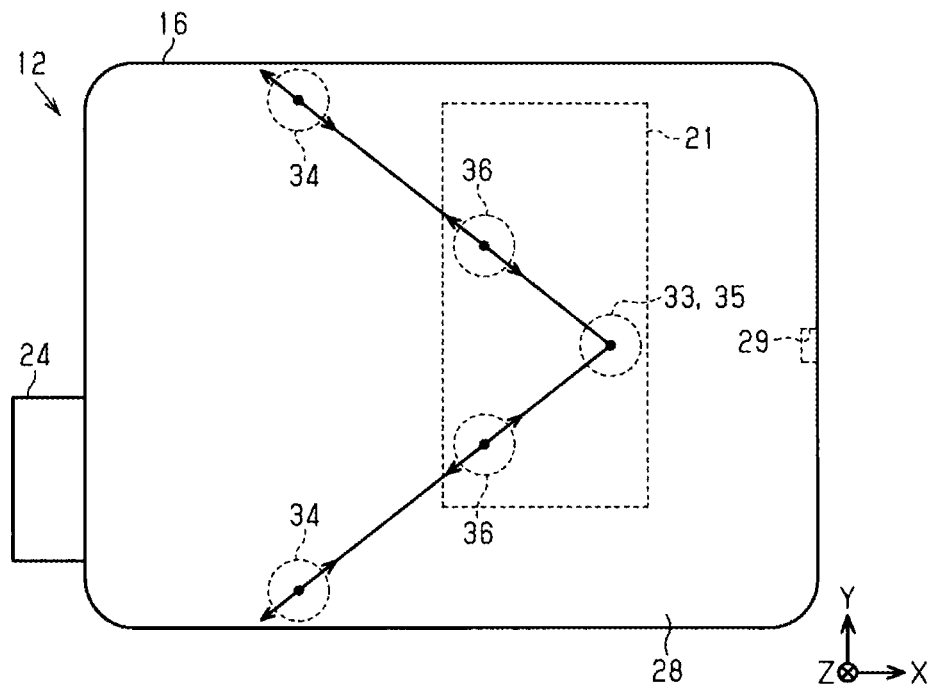
FIG. 3 is a schematic plan view of the laser oscillator unit included in the laser machining device of FIG. 1.

As shown in FIG. 3, each of the plurality of outer movable legs 34 allows the case 16 to slide in a radial direction around the outer fixed leg 33 in an XY plane. The radial direction around the outer fixed leg 33 is a direction passing through the center of the outer fixed leg 33 and a center of the outer movable leg 34. The outer movable leg 34 slidably supports the case 16 along straight lines connecting the outer fixed leg 33 and the outer movable legs 34.

The straight lines connecting the outer movable legs 34 and the outer fixed leg 33 intersect with each other at an acute angle. The distances from the plurality of outer movable legs 34 to the outer fixed leg 33 are the same. Therefore, a triangle having the center of one outer fixed leg 33 and the centers of the two outer movable legs 34 is an isosceles triangle having an acute vertex angle, and the outer movable legs 34 slide along hypotenuses of the isosceles triangle.

Each of the plurality of inner movable legs 36 allows the amplification unit 21 to slide in the radial direction around the inner fixed leg 35 in the XY plane. The radial direction around the inner fixed leg 35 is a direction passing through the center of the inner fixed leg 35 and a center of the inner movable leg 36. The inner movable leg 36 slidably supports the amplification unit 21 along straight lines connecting the inner fixed leg 35 and the inner movable legs 36.

The straight lines connecting the inner movable legs 36 and the inner fixed leg 35 intersect with each other at an acute angle. The distances from the plurality of inner movable legs 36 to the inner fixed leg 35 are the same. Therefore, a triangle having the center of one inner fixed leg 35 and the centers of the two inner movable legs 36 is an isosceles triangle having an acute vertex angle, and the inner movable legs 36 slides along hypotenuses of the isosceles triangle.

The radial direction around the outer fixed leg 33 and the radial direction around the inner fixed leg 35 are orthogonal to the straight line connecting the center of the outer fixed leg 33 and the center of the inner fixed leg 35, and coincide with each other.

A straight line along the Z-axis through the center of each inner movable leg 36 is orthogonal to a line segment connecting the center of the outer fixed leg 33 and the center of the corresponding outer movable leg 34. Therefore, the straight line connecting each outer movable leg 34 and the outer fixed leg 33 is parallel to the straight line connecting the corresponding inner movable leg 36 and the inner fixed leg 35.

Figure 4:
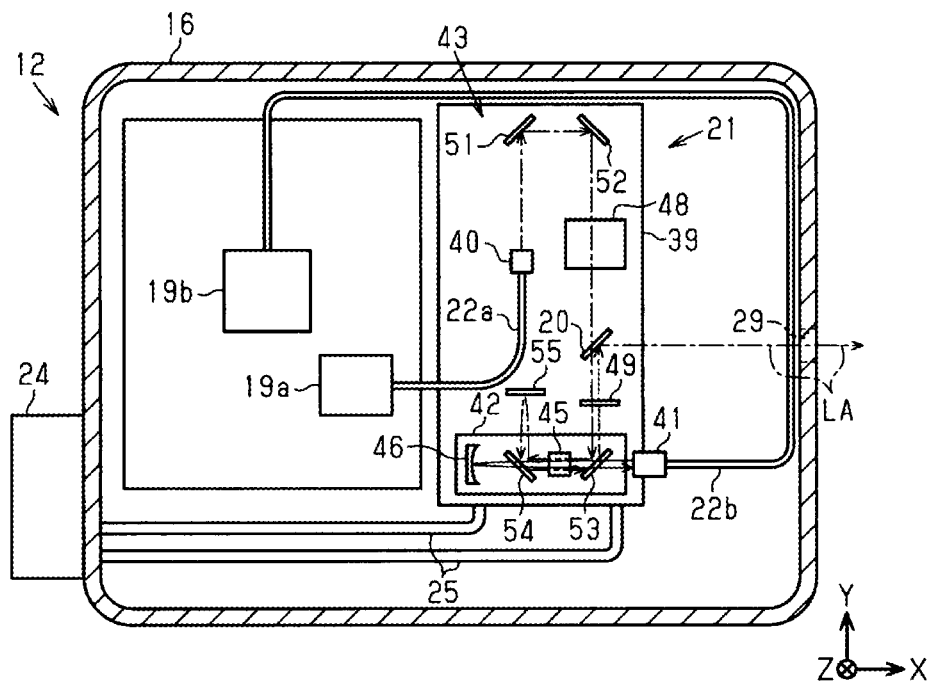
FIG. 4 is a schematic plan view showing an internal configuration of the laser oscillator unit.

As shown in FIG. 4, the amplification unit 21 includes a plate-shaped support portion 39, a seed light incident portion 40 to which the first optical fiber 22a is connected, an excitation light incident portion 41 to which the second optical fiber 22b is connected, an amplification portion 42 that amplifies the incident seed laser light, and a guide portion 43 that guides the seed laser light to the emitting portion 20. The support portion 39 supports the seed light incident portion 40, the excitation light incident portion 41, the amplification portion 42, and the guide portion 43.

The amplification portion 42 includes a laser medium 45 such as a crystal excited by the excitation laser light, and an excitation light reflection mirror 46 that reflects the excitation laser light. The guide portion 43 includes a crystal 48, a Faraday rotator 49, and a plurality of (five in the present embodiment) first reflection mirror 51 to a fifth reflection mirror 55. In FIG. 4, the excitation laser light is indicated by a solid arrow, and the seed laser light and the laser light obtained by amplifying the seed laser light are indicated by a dashed-dotted arrow.

The seed laser light incident into the amplification unit 21 from the seed light incident portion 40 is reflected by the first reflection mirror 51, the second reflection mirror 52, the third reflection mirror 53, and the fourth reflection mirror 54 in this order, and then folded back by the fifth reflection mirror 55. Next, the seed laser light is reflected by the fourth reflection mirror 54 and the third reflection mirror 53 in this order and guided to the emitting portion 20. The laser medium 45 is arranged between the third reflection mirror 53 and the fourth reflection mirror 54. The seed laser light is guided to the laser medium 45 by the first reflection mirror 51 to the fifth reflection mirror 55 and amplified, and the amplified laser light is emitted from the emitting portion 20.

The Faraday rotator 49 is arranged between the third reflection mirror 53 and the emitting portion 20. The Faraday rotator 49 changes a polarization direction of the laser light reflected by the second reflection mirror 52 and transmitted through the emitting portion 20.

The emitting portion 20 reflects the laser light amplified by the amplification portion 42 and returned to the emitting portion 20 and guides the laser light to the window portion 29.

The case 16 and the support portion 39 are made of mutually different metals. In the present embodiment, the support portion 39 is made of stainless steel, and the case 16 is made of aluminum whose specific gravity is lighter than that of stainless steel.

Operation of the present embodiment will be described.

The case 16 expands when an ambient temperature is high, and contracts when the ambient temperature is low. Since the support portion 39 is cooled by the cooling mechanism 24 and is made of stainless steel that is less likely to expand and contract than aluminum, an amount of expansion and contraction is smaller than that of the case 16.

The case 16 expands and contracts around the outer fixed leg 33, and the outer movable leg 34 and the inner movable leg 36 allow expansion and contraction of the case 16. Therefore, the case 16 expands and contracts in a state in which twisting with respect to the XY plane is suppressed. Since the inner fixed leg 35 supporting the amplification unit 21 is provided at the same position as the outer fixed leg 33 in the X-axis direction and the Y-axis direction, the position of the amplification unit 21 with respect to the outer fixed leg 33 is maintained.

Effects of the present embodiment will be described.

(1) The case 16 may expand or contract with a change in the ambient temperature. In this regard, since the laser oscillator unit 12 includes the plurality of outer movable legs 34, even when the case 16 expands or contracts, the plurality of outer movable legs 34 allow the case 16 to expand and contract, and the twisting of the case 16 can be reduced. Since the laser oscillator unit 12 includes the plurality of inner movable legs 36, it is possible to reduce a possibility that the expansion and contraction of the case 16 is transmitted to the amplification unit 21. Since the at least one outer movable leg 34 allows the case 16 to slide in the radial direction around the outer fixed leg 33, it is possible to reduce a possibility that the window portion 29 moves even when the case 16 expands and contracts. Since the at least one inner movable leg 36 allows the amplification unit 21 to slide in the radial direction around the inner fixed leg 35, it is possible to reduce a possibility that the emitting portion 20 moves even when the case 16 expands and contracts. The straight line passing through the center of the outer fixed leg 33 and the center of the inner fixed leg 35 intersects with the straight line passing through the emitting portion 20 and the window portion 29, and the optical axis LA of the laser light emitted from the emitting portion 20 and the optical axis LA of the laser light emitted from the window portion 29 coincide with each other, so that it is possible to reduce a possibility that the optical axis LA is inclined when the case 16 expands and contracts. Therefore, the deviation of the optical axis LA due to the expansion and contraction of the case 16 can be reduced.

(2) The case 16 and the support portion 39 are made of a metal. Therefore, for example, as compared with a case where the case 16 and the support portion 39 are made of resin, the expansion and contraction of the case 16 and the support portion 39 are large, and the positions of the window portion 29 and the emitting portion 20 are likely to deviate. In this respect, since the laser oscillator unit 12 includes the outer support mechanism 17 and the inner support mechanism 18, it is possible to reduce a possibility that the optical axis LA deviates.

(3) The case 16 and the support portion 39 are made of mutually different metals. Therefore, for example, as compared with a case where the case 16 and the support portion 39 are made of the same metal, a difference in the expansion and contraction of the case 16 and the support portion 39 due to a difference in a thermal expansion coefficient becomes large, and the positions of the window portion 29 and the emitting portion 20 are likely to deviate. In this respect, since the laser oscillator unit 12 includes the outer support mechanism 17 and the inner support mechanism 18, it is possible to reduce the possibility that the optical axis LA deviates.

(4) A slidable direction of the case 16 and a slidable direction of the amplification unit 21 are parallel. Therefore, when the case 16 expands or contracts, the case 16 and the amplification unit 21 have the same sliding direction, so that a deviation amount of the slide between the case 16 and the amplification unit 21 can be suppressed.

(5) Since the plurality of outer movable legs 34 allow the case 16 to slide in the radial direction around the outer fixed leg 33, a direction in which the case 16 expands and contracts can be defined. Since the straight lines connecting the outer movable legs 34 and the outer fixed legs 33 intersect with each other at the acute angle, the slide mechanism 37 that slides the case 16 can be made simpler than a case where the plurality of outer movable legs 34 are arranged apart from each other.

(6) The amount of expansion or contraction of the case 16 when the case 16 expands or contracts increases as the case 16 moves away from the outer fixed leg 33. In this respect, since the distances from the plurality of outer movable legs 34 to the outer fixed leg 33 are the same, a variation in a slide amount of the plurality of outer movable legs 34 to allow the case 16 to slide can be reduced.

(7) Since the straight line passing through the center of the outer fixed leg 33 and the center of the inner fixed leg 35 is orthogonal to the straight line passing through the emitting portion 20 and the window portion 29, the deviation between the emitting portion 20 and the window portion 29 can be further reduced.

(8) The outer fixed leg 33 is located closer to the window portion 29 than the outer movable leg 34, and the inner fixed leg 35 is located closer to the emitting portion 20 than the inner movable leg 36. Therefore, it is possible to reduce the possibility that the window portion 29 or the emitting portion 20 move even when the case 16 expands and contracts.

(9) For example, when the outer support mechanism 17 is provided on a side surface of the case 16, the outer support mechanism 17 needs to allow the expansion and contraction of the case 16 in the direction along the bottom surface 16a and the direction intersecting with the bottom surface 16a. In this respect, the outer support mechanism 17 is provided on the bottom surface 16a of the case 16. Therefore, the outer support mechanism 17 only needs to allow the expansion and contraction of the case 16 in the direction along the bottom surface 16a, and a configuration of the outer support mechanism 17 can be simplified.

The present embodiment can be modified and implemented as follows. The present embodiment and the following modifications can be implemented in combination with each other as long as they do not have technical contradiction.

The outer fixed leg 33 may rotatably support the case 16 in a state in which a center position is maintained. The inner fixed leg 35 may rotatably support the amplification unit 21 in a state in which a center position is maintained.

The outer fixed leg 33 and the inner fixed leg 35 may have different positions in the X-axis direction. For example, the outer fixed leg 33 may be arranged so as to be aligned with the window portion 29 in the Z-axis direction. The outer fixed leg 33 and the inner fixed leg 35 are arranged at the same position as the straight line in which the optical axis LA extends in the Y-axis direction, and the straight line passing through the center of the outer fixed leg 33 and the center of the inner fixed leg 35 may intersect with the straight line passing through the emitting portion 20 and the window portion 29.

At least one of the outer fixed leg 33 and the outer movable leg 34 may be provided on the side surface of the case 16.

The linear distance between the outer fixed leg 33 and the window portion 29 may be equal to or greater than the linear distance between the outer movable leg 34 and the window portion 29. The linear distance between the inner fixed leg 35 and the emitting portion 20 may be equal to or greater than the linear distance between the inner movable leg 36 and the emitting portion 20.

The distances from the plurality of outer movable legs 34 to the outer fixed leg 33 may be different to each other. The distances from the plurality of inner movable legs 36 to the inner fixed leg 35 may be different to each other.

The straight lines connecting the outer fixed leg 33 and the outer movable legs 34 may intersect at a right angle or an obtuse angle. The straight lines connecting the inner fixed leg 35 and the inner movable legs 36 may intersect at a right angle or an obtuse angle.

In the plurality of outer movable legs 34, one outer movable leg may allow the case 16 to slide in the radial direction around the outer fixed leg 33, and the other outer movable legs 34 may allow the case 16 to slide in a direction different from the radial direction. In the plurality of inner movable legs 36, one inner movable leg 36 may allow the case 16 to slide in the radial direction around the inner fixed leg 35, and the other inner movable legs 36 may allow the case 16 to slide in a direction different from the radial direction.

The straight line connecting the center of the outer fixed leg 33 and the center of the outer movable leg 34 and the straight line connecting the inner fixed leg 35 and the center of the inner movable leg 36 may be non-parallel.

The case 16 and the support portion 39 may be made of the same material. The case 16 and the support portion 39 may be made of a material such as resin.

Although the support portion 39 of the embodiment has been described as a plate-shaped support portion, the present invention is not limited to this, and for example, a case may be configured such that a portion of the support portion 39 (plate-shape) referred to here is a bottom plate.

The laser machining device 11 may be a laser marking device that marks a character or the like on the machining target object 14, a laser cutter device that cuts the machining target object 14, a laser welding device that welds the machining target objects 14, a laser drilling device that drills a hole in the machining target object 14, or the like. The laser oscillator unit 12 is not limited to the laser machining device 11, and may be a laser sensor or the like that measures a passage of an object or a distance to the object.

The present application is based on a Japanese Patent Application (Patent Application No. 2018-066796) filed on Mar. 30, 2018, the contents of which are incorporated herein by reference.

REFERENCE SIGNS LIST

11: laser machining device
12: laser oscillator unit
13: condenser lens
14: machining target object
16: case
16a: bottom surface
17: outer support mechanism
18: inner support mechanism
20: emitting portion
21: amplification unit
29: window portion
31: base
33: outer fixed leg
34: outer movable lea
35: inner fixed leg
36: inner movable lea
39: support portion

What is claimed is:
1. A laser oscillator unit comprising:
an amplification unit configured to amplify incident laser light and emit amplified laser light from an emitting portion;
a case covering the amplification unit;
an outer support mechanism provided outside the case and supporting the case with respect to a base; and an inner support mechanism provided inside the case and supporting the amplification unit with respect to the case, wherein the case is formed with a window portion that outputs the laser light emitted from the emitting portion to an outer side of the case by spatial transmission, wherein the outer support mechanism comprises:
- an outer fixed leg that is fixed to the base and the case; and
- a plurality of outer movable legs that slidably support the case with respect to the base, wherein at least one outer movable leg of the plurality of outer movable legs allows the case to slide in a radial direction around the outer fixed leg, wherein the inner support mechanism comprises:
- an inner fixed leg that is fixed to the amplification unit and the case; and
- a plurality of inner movable legs that slidably support the amplification unit with respect to the case, wherein at least one inner movable leg of the plurality of inner movable legs allows the amplification unit to slide in a radial direction around the inner fixed leg, and wherein a straight line passing through a center of the outer fixed leg and a center of the inner fixed leg intersects with a straight line passing through the emitting portion and the window portion, and a laser optical axis emitted from the emitting portion and a laser optical axis emitted from the window portion coincide with each other.

2. The laser oscillator unit according to claim 1,
wherein the amplification unit comprises:
- an amplification portion that amplifies the incident laser light; and
- a support portion that supports the amplification portion, and wherein the case and the support portion are made of metal.

3. The laser oscillator unit according to claim 2,
wherein the case and the support portion are made of mutually different metals.

4. The laser oscillator unit according to claim 1,
wherein a straight line connecting the outer movable leg and the outer fixed leg, the outer movable leg slidably supporting the case in the radial direction around the outer fixed leg, is parallel to a straight line connecting the inner movable leg and the inner fixed leg, the inner movable leg slidably supporting the amplification unit in the radial direction around the inner fixed leg.

5. The laser oscillator unit according to claim 1,
wherein each of the plurality of outer movable legs allows the case to slide in the radial direction around the outer fixed leg, and wherein the straight lines connecting the outer movable legs and the outer fixed leg intersect with each other at an acute angle.

6. The laser oscillator unit according to claim 1,
wherein distances from the plurality of outer movable legs to the outer fixed leg are the same.

7. The laser oscillator unit according to claim 1,
wherein the straight line passing through the center of the outer fixed leg and the center of the inner fixed leg is orthogonal to the straight line passing through the emitting portion and the window portion.

8. The laser oscillator unit according to claim 1,
wherein a linear distance between the outer fixed leg and the window portion is shorter than a linear distance between the outer movable legs and the window portion, and wherein a linear distance between the inner fixed leg and the emitting portion is shorter than a linear distance between the inner movable legs and the emitting portion.

9. The laser oscillator unit according to claim 1,
wherein the outer support mechanism is provided on a bottom surface of the case facing the base.

10. A laser machining device comprising:
the laser oscillator unit according to claim 1; and
a condenser lens configured to condense laser light output from the laser oscillator unit, wherein the laser machining device machines a machining target object by the condensed laser light.

* * * * *

UNITED STATES PATENT AND TRADEMARK OFFICE
CERTIFICATE OF CORRECTION

PATENT NO. : 11,146,034 B2  
APPLICATION NO. : 16/969251  
DATED : October 12, 2021  
INVENTOR(S) : Taku Otani et al.

Page 1 of 1

It is certified that error appears in the above-identified patent and that said Letters Patent is hereby corrected as shown below:

On the Title Page

Item (73) the Assignee "PANASONIC INDUSTRIAL DEVICES SUNZ CO., LTD., Aichi (JP)" should read -- PANASONIC INDUSTRIAL DEVICES SUNX CO., LTD., Aichi (JP) --

In the Specification

Column 10, Line 55, "34: outer movable lea" should read -- 34: outer movable leg --

Column 10, Line 57, "36: inner moveable lea" should read -- 36: inner moveable leg --

Column 10, Line 59, Insert missing text: -- 42: amplification portion --

Signed and Sealed this  
Tenth Day of May, 2022

Katherine Kelly Vidal  
*Director of the United States Patent and Trademark Office*